(12) United States Patent
Gomi et al.

(10) Patent No.: US 6,382,916 B1
(45) Date of Patent: May 7, 2002

(54) BLADE ASSEMBLY FOR HYDRAULIC POWER TRANSMITTING APPARATUS AND METHOD OF MANUFACTURING SAME

(75) Inventors: Kenji Gomi; Toshihide Aoki, both of Shizuoka-ken (JP)

(73) Assignee: Kabushiki Kaisha Yutaka Giken, Shizuoka-ken (JP)

( * ) Notice: Subject to any disclaimer, the term of this patent is extended or adjusted under 35 U.S.C. 154(b) by 0 days.

(21) Appl. No.: 09/644,548

(22) Filed: Aug. 24, 2000

(30) Foreign Application Priority Data

Aug. 27, 1999 (JP) .......................... 11-242100
Aug. 9, 2000 (JP) ....................... 2000-241197

(51) Int. Cl.$^7$ .......................... F03B 3/12; B21K 25/00; B23P 15/04
(52) U.S. Cl. ................. 416/197 C; 29/889.5
(58) Field of Search ...................... 416/197 C; 29/889.5

(56) References Cited

U.S. PATENT DOCUMENTS 2,304,721 A * 12/1942 Werther .............. 416/197 C X
2,890,661 A * 6/1959 Egbert .................... 29/889.5 X
5,706,656 A * 1/1998 Hinkel ................... 29/889.5 X
5,893,704 A * 4/1999 Prater .................... 29/889.5 X

FOREIGN PATENT DOCUMENTS

JP          7-4496       1/1995
JP          9-42413      2/1997

* cited by examiner

Primary Examiner—John Ryznic
(74) Attorney, Agent, or Firm—Arent Fox Kintner Plotkin & Kahn

(57) ABSTRACT

A blade assembly for a hydraulic power transmitting apparatus is made up of a plurality of blades disposed at an equal distance from one another; a joint piece provided at a radially outer end of each of the blades; and a tie member for tying the blades together at the joint pieces. The blades, the joint pieces and the tie member are integrally formed as a continuous semi-manufactured product of a belt-shaped metal plate. Each of the blades is raised or erected from a plane including the tie member. The joint piece is bent to change a direction of the tie member. The tie member containing therein a required number of blades is fixedly joined together at both ends into a ring shape.

8 Claims, 6 Drawing Sheets

BLADE ASSEMBLY FOR HYDRAULIC POWER TRANSMITTING APPARATUS AND METHOD OF MANUFACTURING SAME

BACKGROUND OF THE INVENTION

1. Field of the Invention

The present invention relates to a blade assembly for a hydraulic power transmitting apparatus and a method of manufacturing the blade assembly. The blade assembly is for use in a pump or a turbine of a hydraulic power transmitting apparatus and is made of a metallic plate by fixing blades to a shell.

2. Description of Related Art

An art of manufacturing a blade assembly of a hydraulic power transmitting apparatus by pressing it from a metallic plate is disclosed, e.g., in Japanese Published Unexamined Patent Application Nos. 4496/1995, 42413/1997, or the like.

In the art disclosed in Japanese Published Unexamined Patent Application No. 4496/1995, a semi-manufactured product having a plurality of blades disposed between a ring on an outer periphery and a ring on an inner periphery is formed from a single metallic plate by pressing or punching. The blades are twisted to thereby form a blade assembly. Two blade assemblies are combined into one while the blade position is shifted by an amount corresponding to one pitch or half the pitch, and are welded together to the shell. According to this art, a square metallic plate one side of which corresponds to the diameter of the blade assembly is required. This square plate will result in substantially triangular waste plate pieces (i.e., scraps) at each four corner of the metallic plate, and in a circular scrap plate in the center thereof, resulting in much waste of the material. In addition, by combining two blade assemblies into one, the weight increases because there are two rings on an outer periphery and on an inner periphery, respectively.

On the other hand, in the art disclosed in Japanese Published Unexamined Patent Application No. 42413/1997, a band-shaped metallic plate is used as a raw material. There are punched out a metallic plate having two parallelly disposed tie members and blade portion which is connected to both the above-described tie members. One of the tie members is slightly bent into a ring shape to thereby form an outer peripheral pitch. The other of the tie members is bent, by an amount larger than that of the above-described one of the tie members, into a ring shape to thereby form an inner peripheral pitch. According to this means, much time is required in bending the tie members, and the weight of the blade assembly increases due to the presence of the bent portions.

In view of the above-described points in the prior art, the present invention has an object of providing a blade assembly and a method of manufacturing the same in which the blade assembly can be manufactured easily with a minimum waste in the raw material and in which the blade assembly can be fixed to the shell without adversely affecting the power transmitting efficiency.

SUMMARY OF THE INVENTION

In order to attain the above and other objects, the present invention is a blade assembly for a hydraulic power transmitting apparatus. The blade assembly comprises: a plurality of blades disposed at an equal distance from one another; a joint piece provided at a radially outer end of each of the blades; and a tie member for tying the blades together at the joint pieces, wherein the blades, the joint pieces and the tie member are integrally formed as a continuous semi-manufactured product of a belt-shaped metal plate, each of the blades being erected from a plane including said tie member, the joint pieces being bent to change a direction of the tie member, and the tie member containing therein a required number of blades being fixedly joined together at both ends thereof into a ring shape.

According to this arrangement, since the blade assembly is made up of the blades and the tie member which constitute a continuous product, there is no extra or overlapped portion. Therefore, the blade assembly can be made light in weight.

Preferably, the tie member of the blade assembly is fixedly connected to a shell outside an imaginary line which connects an outer peripheral line of fluid flow between a pump and a turbine. According to this arrangement, the portion connecting the blade assembly to the shell does not hinder the flow of the working fluid in the blade assembly. Therefore, the efficiency of power transmission does not become poor.

Preferably, the blade assembly is disposed on a pump side and the tie member of the blade assembly encloses an outer periphery of the turbine at a small clearance. According to this arrangement, since the tie member encloses the outer periphery of the turbine at a small clearance, the flow of the working fluid toward the outer periphery can be minimized and is caused to flow smoothly toward the turbine side. As a result, the efficiency of power transmission can be improved.

Preferably, in the blade assembly, an outer periphery of the tie member and an outer edge of each of the blades are brazed to the shell. According to this arrangement, the area of brazing is large with a large mechanical strength. Especially in the outer periphery of the pump in which a large centrifugal force operates, since the blades are brazed at their outer edge, the mechanical strength is high. Most preferably, to secure a still higher mechanical strength, the joint piece shall also be brazed.

In another aspect of the present invention, there is provided a method of manufacturing a blade assembly for a hydraulic power transmitting apparatus. The method comprises the steps of: feeding a belt-shaped metal plate in a longitudinal direction thereof; punching the metal plate to obtain a continuous semi-manufactured product having therein a plurality of blades and a pair of tie members to which a radially outer end and a radially inner end of each of the blades are connected, respectively; removing that one of the tie members which is connected to the inner end of each of the blades; twisting each of the blades to thereby raise each of the blades from a plane which includes the other of the tie members; bending each of joint pieces which are connected to the other of the tie members to thereby change a direction of the joint pieces; cutting the other of the tie members to thereby obtain a semi-manufactured product which contains therein a required number of blades; and fixedly joining the other of the tie members at both ends thereof into a ring shape.

According to this method, the tie member is bent at the joint pieces into a ring shape. Therefore, the bending into the ring shape can be made easily, resulting in an easy forming of the ring-shaped blade assembly.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

An explanation will now be made about a preferred embodiment of the present invention with reference to the accompanying drawings.

Figure 1:
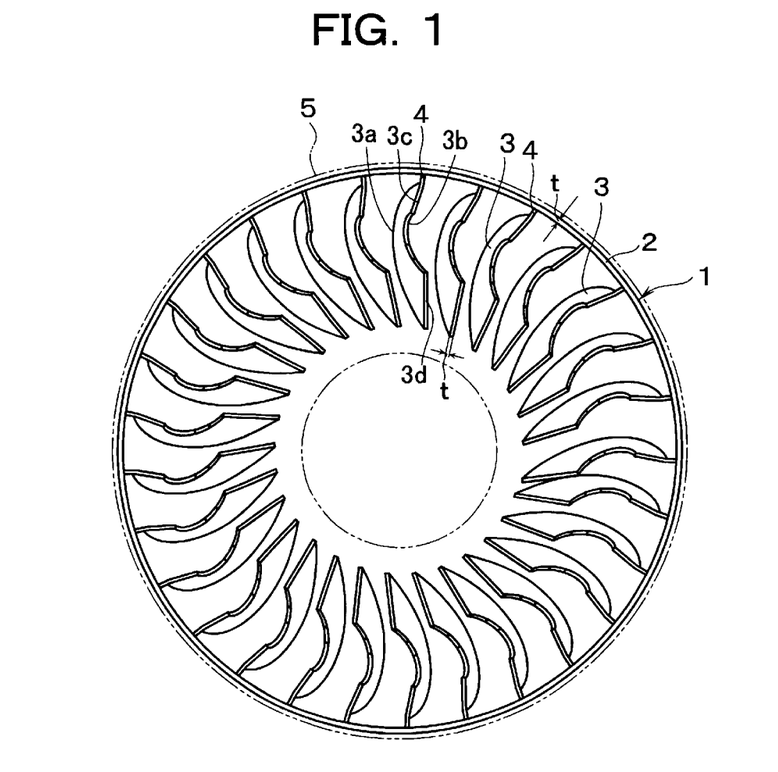
FIG. 1 is a plan view of showing one example of a blade assembly according to the present invention.
Figure 2:
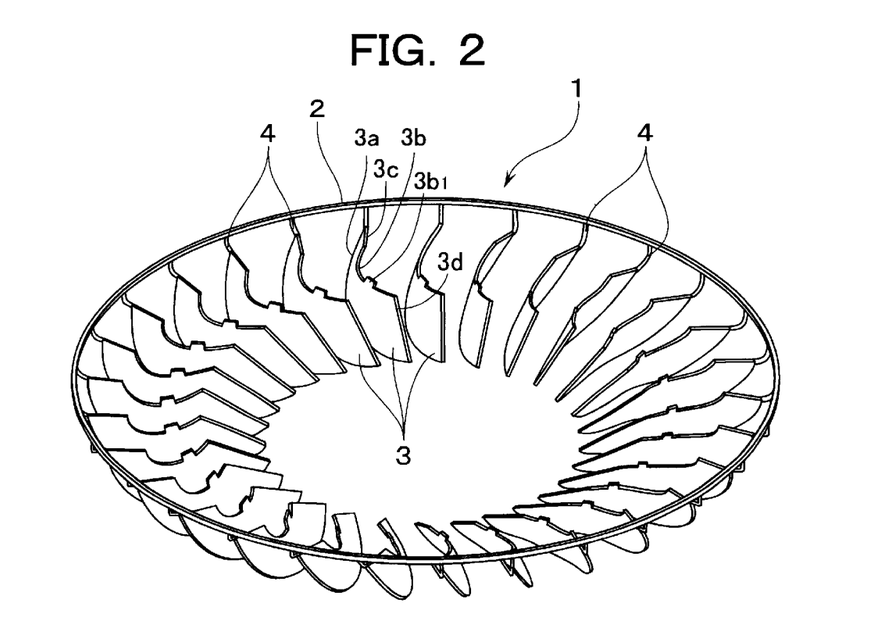
FIG. 2 is a perspective view thereof.
Figure 6:
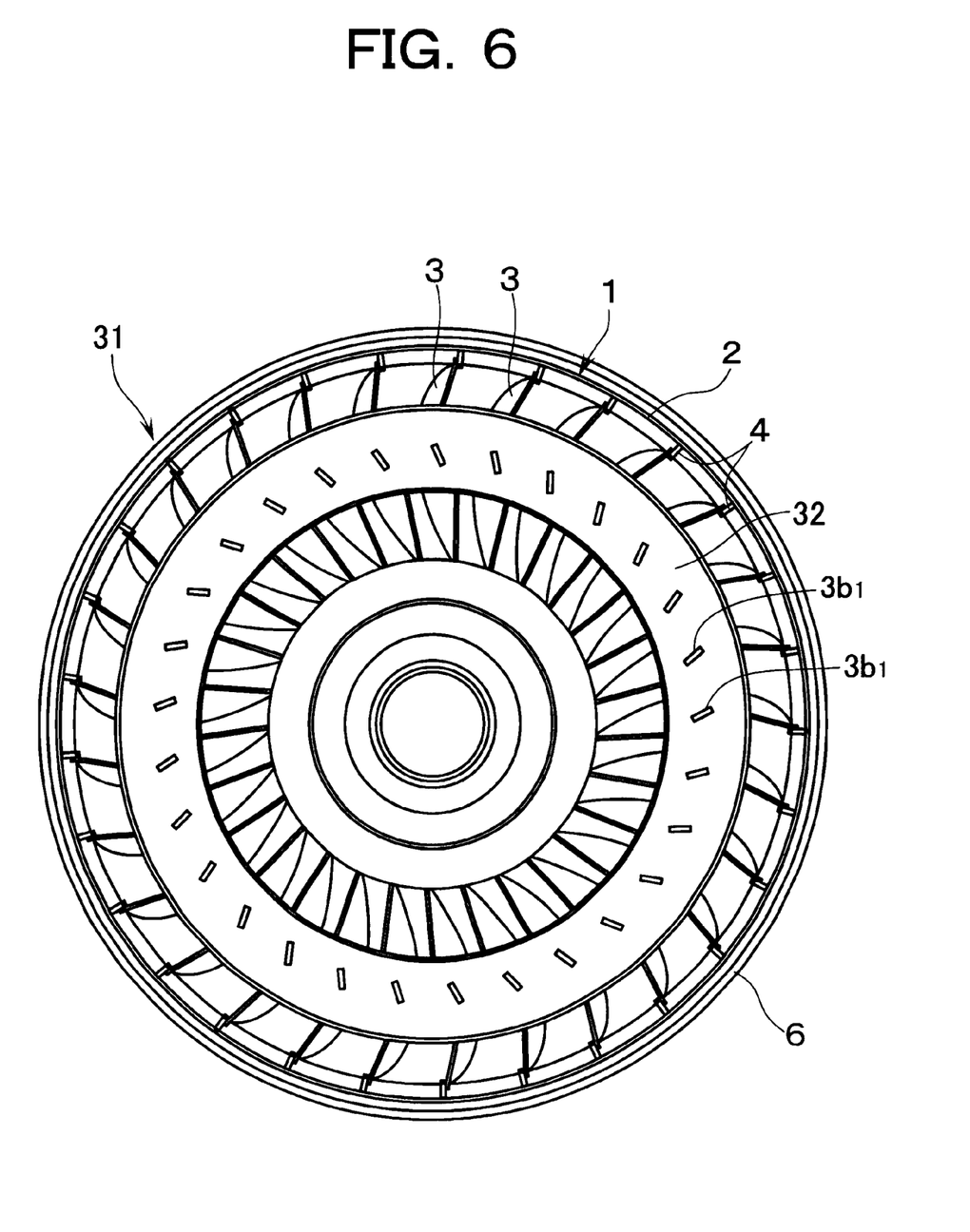
FIG. 6 is a front view of a pump.
Figure 7:
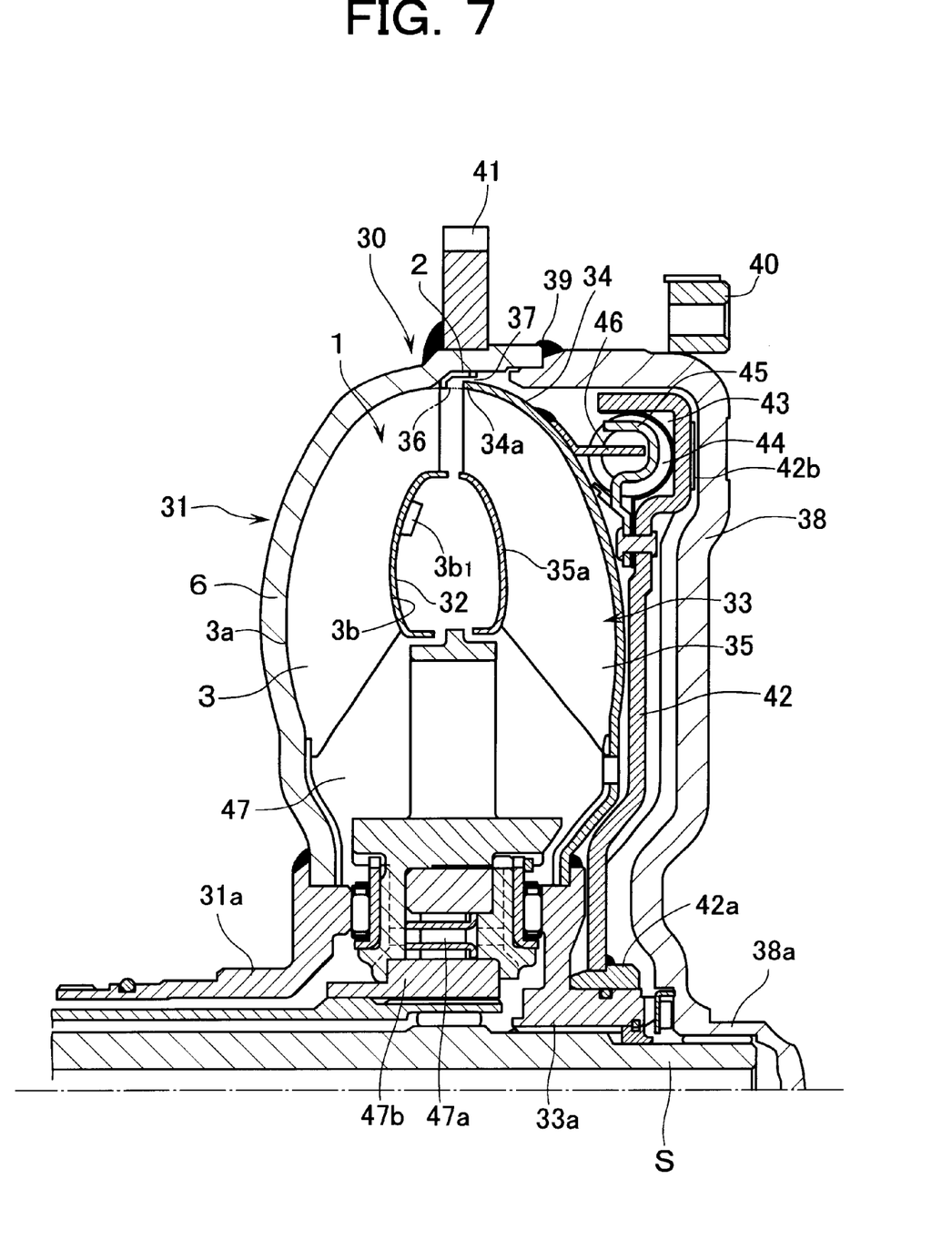
FIG. 7 is a sectional view of the hydraulic power transmission apparatus in which the pump in FIG. 6 is used.

In FIGS. 1 and 2, reference numeral 1 denotes a blade assembly according to the present invention. This blade assembly 1 has a ring-shaped tie member 2. A total of 29 blades 3 are continuously connected through a joint piece 4 which is positioned on a radially outer end of the blade assembly 1 at an equal distance between adjacent blades 3. As shown in FIG. 1, this blade assembly is made of a metal plate having a thickness of "t" and, therefore, the thicknesses of the tie member 2, the blade 3, or the like are "t". Each of the blades 3 is made up of a bent external edge 3a, a bent internal edge 3b and straight blade tip portions 3c, 3d. The external edge 3a is brazed to a concave surface of a shell 6. A core is brazed to the internal edge 3b. The tie member 2 may or may not be brazed to the shell 6 (FIGS. 6 and 7).

Figure 3A:
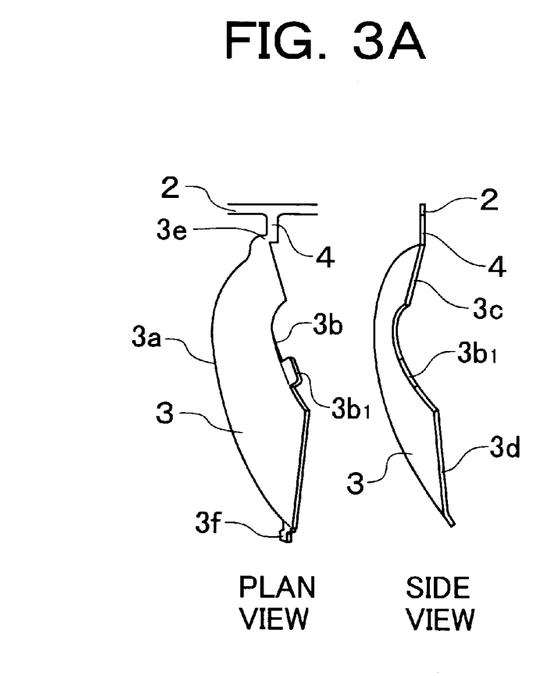
FIGS. 3A–3C are views to explain some important portion of the manufacturing steps, in which each of the left sides shows a plan view and each of the right sides shows a side view, respectively.
Figure 3B:
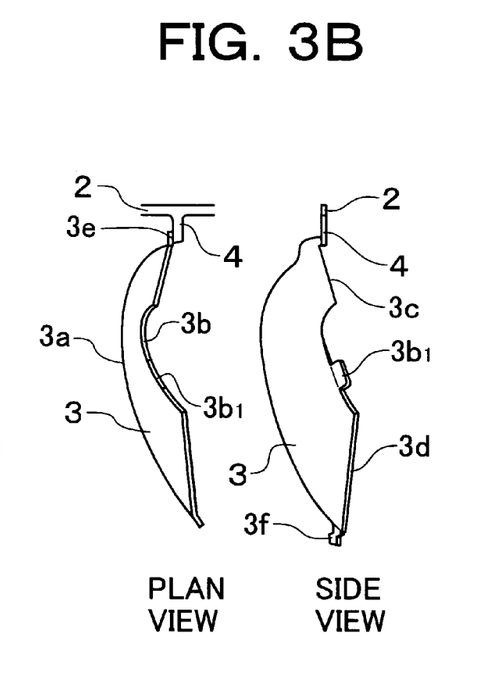
Figure 3C:
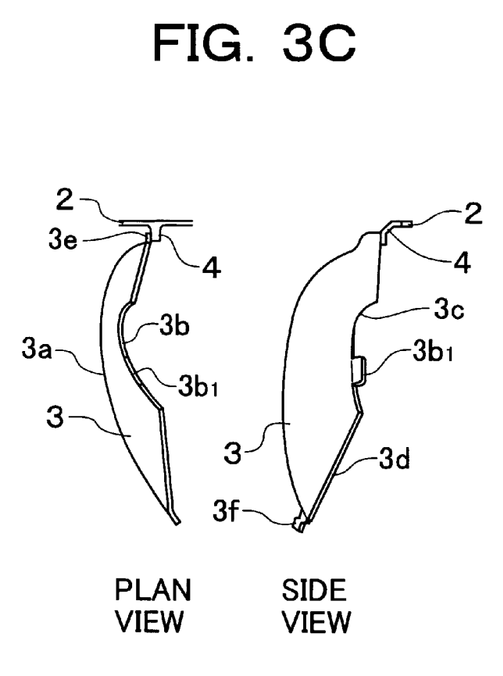

FIGS. 3A, 3B and 3C show an extract of the manufacturing steps of the blade assembly 1. In these intermediate steps, the outer tip 3e of each of the blades 3 is coupled to the tie member 2 through the joint piece 4. In this specification, reference is sometimes made only to one blade 3 out of a plurality of blades 3 for the sake of simplicity. In FIG. 3A, the inner tip 3f of each of the blades 3 is in a state of being separated (or severed) from the tie member 2. In the step of FIG. 3A, the blade 3 is formed into a curved shape. In the next step shown in FIG. 3B, the blade 3 is bent or erected at the outer tip 3e of the blade 3. As a result, the blade 3 (as seen in the plan view of FIG. 3B) becomes substantially vertical in direction relative to the plane (or surface) of the drawing sheet of FIG. 3B (i.e., the blade 3 is bent or erected substantially at a right-angle to the plane along which the tie member 2 is elongated). In the step of FIG. 3C, the joint piece 4 is bent substantially at a right angle so that the tie member 2 (as seen in the plan view of FIG. 3C) becomes vertical in direction relative to the plane (or surface) of the drawing sheet of FIG. 3C (i.e., the joint piece 4 is bent in substantially the same direction as the direction in which the blade 3 was bent in the step of FIG. 3B). Once the tie member 2 is changes its direction to the above-described direction, the tie member 2 can be easily bent into a ring shape as shown in FIG. 1. The tie member 2 is then cut at a length containing within the length the required number of blades, and both longitudinal ends of the tie member 2 are fixedly joined together, end to end, to thereby complete the blade assembly 1. In the figure, reference numeral $3b_1$ denotes a notch for connecting the blades 3 together.

Figure 4:
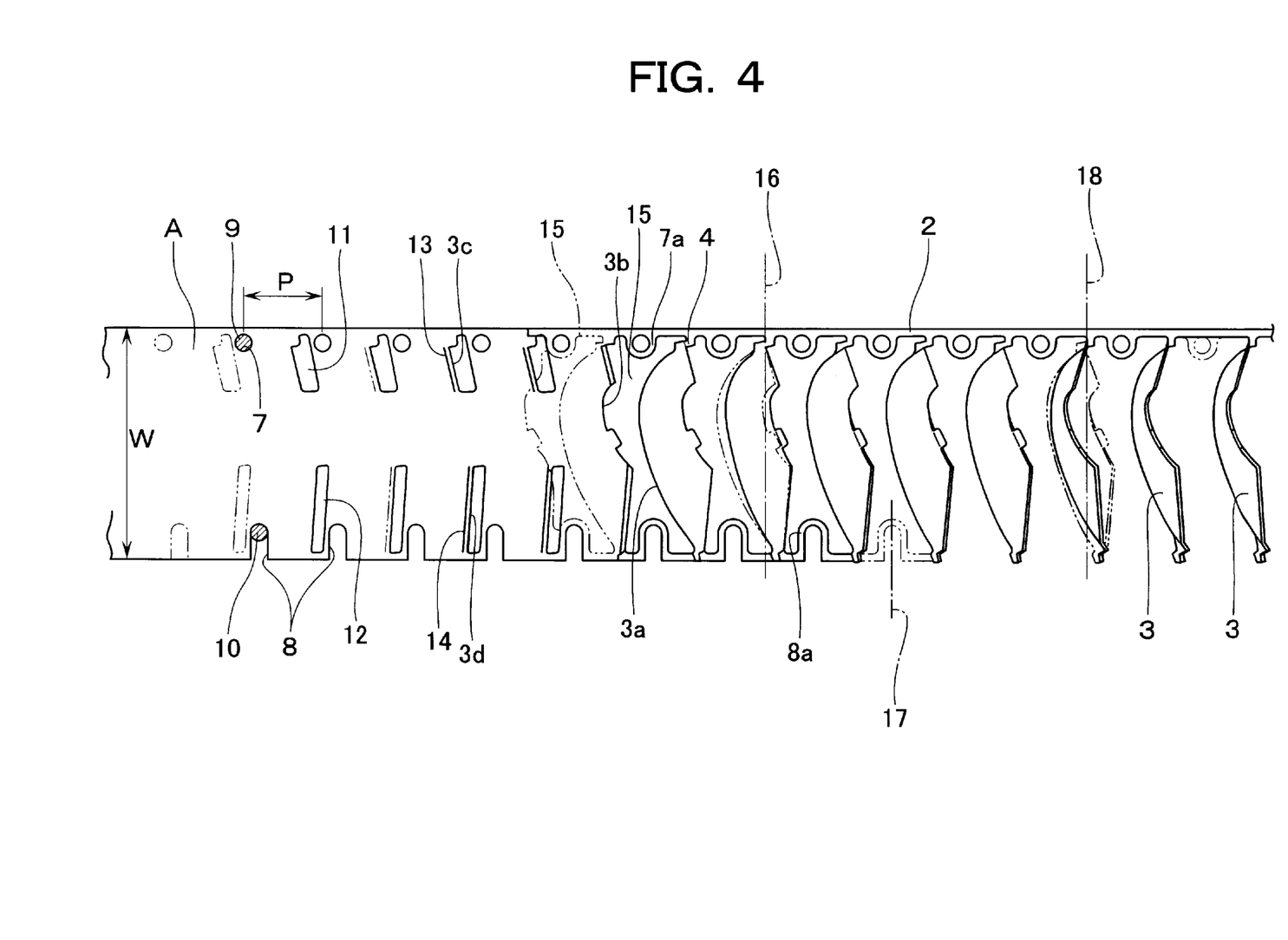
FIG. 4 is a side view to explain the former half of the manufacturing steps.
Figure 5:
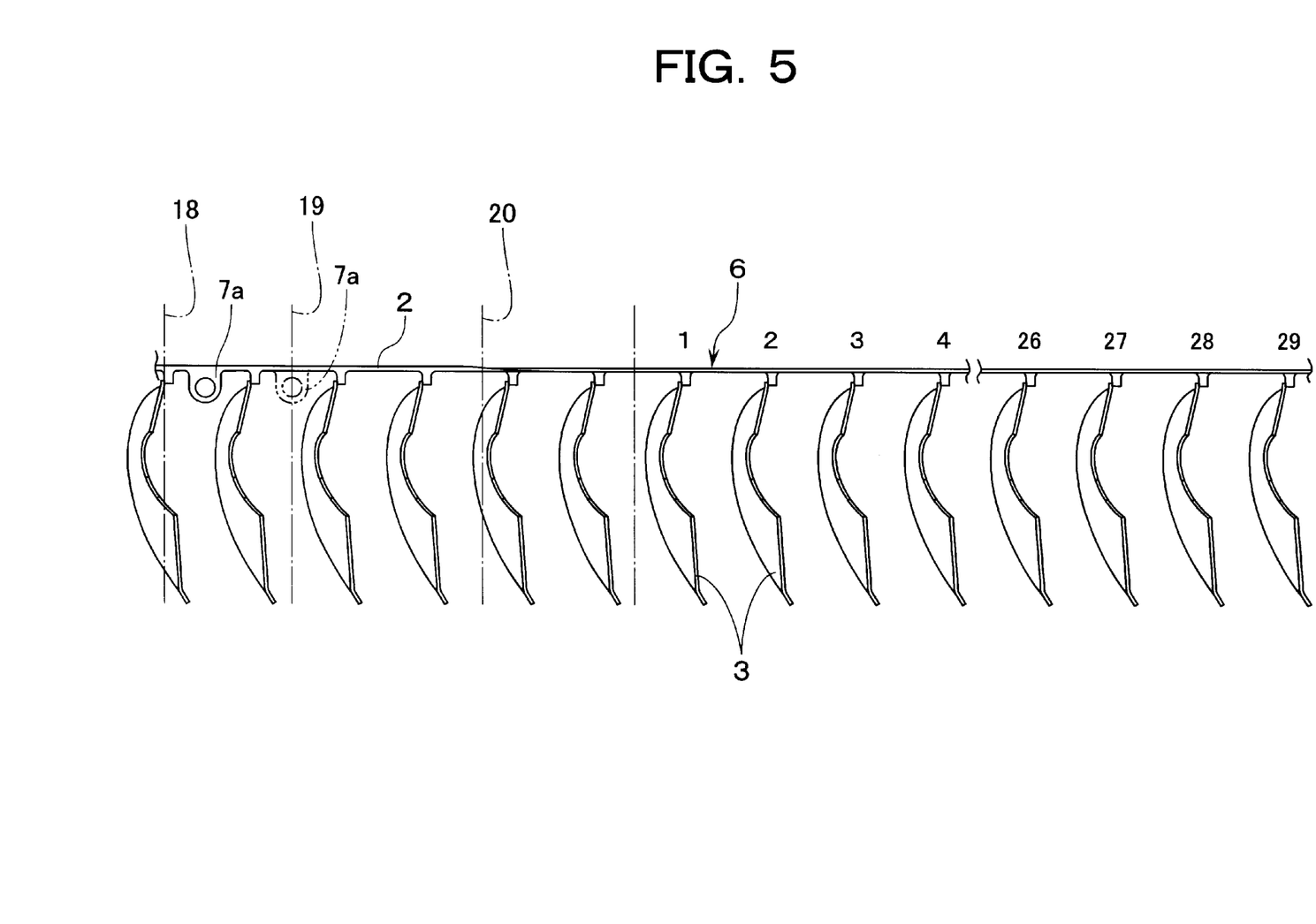
FIG. 5 is a side view to explain the latter half of the manufacturing steps.

FIGS. 4 and 5 show steps of punching or pressing a continuous member 6 in which the blades 3 and the tie member 2 are integrally formed, out of a band-shaped metal plate A having a width W.

On both widthwise sides of the metal plate A, there are first provided pilot holes 7 and pilot slots 8 at an equal pitch of P. Feed pins 9, 10 are respectively fit into the pilot holes 7 and pilot slots 8 to thereby feed the metal plate A one pitch at a time. Though not shown, the feed pins 9, 10 remain fitted into the pilot holes 7 and pilot slots 8 until right before the pilot holes 7 and pilot slots 8 are removed by punching (or dropped through). The pilot holes 7 and the pilot slots 8 to be removed by punching are shown in imaginary lines. The reason why one of the pilot holes are formed in round holes and the other in slots is to make the round holes the basis for the feeding movement and to allow the slots to move to follow the changes in the width W of the metal plate A.

Next to the pilot holes 7 and the pilot slots 8, punch holes (or drop-through holes) 11, 12 are punched. The drop-through holes 11, 12 are to form the portions which constitute the straight blade tip portions 3c, 3d. Burrs which may occur as a result of punching are trimmed by coining work to be performed in the succeeding pressing step. It is thus so arranged that resistance is not given by the burrs to the flow of the working fluid. In the figures, reference numerals 13 and 14 denote the portions to be subjected to coining. No substantial changes to the surfaces occur except at the burred portions.

Thereafter, a drop-through hole 15 is punched or dropped through. The drop-through hole 15 has such a shape as to form the blade external edge 3a, the blade internal edge 3b and the contour of the joint piece 4 as well as to leave frames 7a, 8a for the pilot hole 7 and the pilot slot 8 as they are. At a processing position 16, the bending processing of the blade 3 as shown in FIG. 3A is performed. At a processing position 17, the frame for the pilot slot 8a is dropped through. As an alternative way, this dropping-through of the frame for the pilot slot 8a may be done together with the dropping-through of the drop-through hole 15. At a processing position 18, the blade 3 is bent at the outer tip 3e of the blade 3, as shown in FIG. 3B, such that the blade 3 becomes substantially vertical to the plane of the drawing sheet as explained hereinabove. At a processing position 19, the frame 7a for the pilot hole 7 is dropped through, as a result of which the belt-shaped tie member 2 is formed. At a processing position 20, the joint piece 4 is bent as shown in FIG. 3C, as a result of which the tie member 2 changes its direction by about 90 degrees also as explained hereinabove. The degree or magnitude in which the direction of the blades, or the like are changed shall, of course, be varied with the shape of the shell into which the blade assembly 1 is put into position.

In this embodiment, the number of blades 3 is twenty-nine (29). Therefore, whenever twenty-nine blades 3 have passed, the tie member 2 is cut away, and the cut ends are coupled end to end for connecting together by means of welding or the like. The blade assembly 1 is thus obtained. The blade assembly 1 thus obtained is placed in position into the shell, and the inner tip 3f of the blade is positioned by a retainer, and the blade external edge 3a is brazed to the shell 6. An element on one side of the hydraulic power transmitting apparatus is thus obtained.

FIG. 6 shows a front view of a pump 31 in which the above-described blade assembly 1 is mounted on the shell 6. FIG. 7 shows a sectional view of a hydraulic power transmitting apparatus in which the above-described pump 31 is assembled. According to this arrangement, the blade assembly 1 is placed in position inside the shell 6. The tie member 2 comes into close contact with the inner surface of that outer peripheral portion of the shell 6 which is slightly enlarged. The external edge 3a of the blade 3 comes into close contact with the inner peripheral surface on the side portion of the shell 6. The external edge 3a and the tie member 2 are brazed to the inner surface of the shell 6. On the internal edge 3b of the blade 3, a ring-shaped inner core 32 is fitted. This inner core 32 has a large number of holes through which pass the notches $3b_1$ for connecting the blades together. The portion in which the inner core 32 and the internal edge 3b of the blade 3 and the notch $3b_1$ comes into contact with each other is brazed to integrate them together and also to secure air tightness. Reference numeral 31a denotes a hub of the pump 31.

The turbine 33 is integrally provided with a hub 33a which rotates together with a driven shaft S, a shell 34 and blades 35. A peripheral end portion 34a on the side of the shell 34 is disposed opposite to the pump 31. The inner surface of the end portion 34a is formed substantially on the same plane that approximately coincides with an imaginary line 36 which shows an outer peripheral plane of the flow of the working fluid to enter from the pump 31. The outer diameter of the end portion 34a is defined to be such that a slight clearance 37 occurs to the inner surface of the tie member 2. This clearance 37 is of such a degree as to minimize the flow of the working fluid toward the outer periphery of the pump.

A front cover 38 has a hub 38a which is loosely fit onto the driven shaft S, and the outer peripheral portion of the front cover 38 is connected to the shell 6 on the side of the pump at a welded portion 39, whereby a container of the hydraulic power transmitting apparatus is formed. On an outer peripheral surface of the container, there are fixed by welding a nut 40 for connecting an input power plate and a ring gear 41.

The clutch plate 42 is provided with a hub 42a, a friction plate 42b, and spring holders 43 at several positions. A coil spring 44 is inserted into each of the spring holders 43. Both ends of the coil spring 44 are held by retainers 45. The shell 34 of the turbine 33 is provided with a pair of projections 46 which come into contact with both ends of each of the coil springs 44. The rotation is transmitted from each of the projections 46 to the clutch plate 42 through the coil springs 44. In this arrangement, when the clutch plate 42 moves to the right (as seen in FIG. 7) by the pressure difference and thus comes into contact with the front cover 38, the input to be applied to the front cover 38 is transmitted to the shell 34 of the turbine 33 through the coil spring 44 and the projection 46, and is further transmitted to the output shaft (driven shaft) S through the hub 33a.

In the figure, reference numeral 35a denotes an inner core of the turbine blade, and reference numeral 47 denotes a stator. The stator 47 is connected to a stationary shaft through a one-way clutch 47a and a hub 47b.

As explained hereinabove, according to the blade assembly of the present invention, the blade assembly is made up of blades and tie members which constitute a continuous semi-manufactured product. Therefore, there is no extra or overlapped portion, and the blade assembly can thus be made light in weight. Further, by fixedly connecting the tie member of the blade assembly to the shell outside an imaginary line which connects an outer peripheral line of fluid flow between the pump and the turbine, the connecting portion lies outside the flow of the fluid inside the shell. Therefore, the fluid flow is not disturbed, resulting in freedom from lowering in the power transmission efficiency. Furthermore, since the blade assembly is disposed on a pump side and the tie member of the blade assembly encloses an outer periphery of the turbine at a small clearance, the leak of the working fluid outside the shell of the turbine is reduced by the tie member, resulting in an improved power transmission efficiency. Still furthermore, in the blade assembly, by brazing together an outer periphery of the tie member and/or an outer edge of each of the blades, the fixing strength on the outer edge side is large. Although the largest centrifugal force of the fluid operates on the outer edge side, a strength to sufficiently withstand this centrifugal force can be obtained.

According to the method of the present invention, by bending the tie member at the joint piece, the tie member can be easily bent into a ring shape. Therefore, the blade assembly in which the blades are connected in the ring shape can be easily manufactured.

It is readily apparent that the above-described blade assembly and the method of manufacturing the same meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a blade assembly for a hydraulic power transmitting apparatus, said method comprising the steps of:

feeding a belt-shaped metal plate in a longitudinal direction thereof;

punching said metal plate to obtain a continuous semi-manufactured product having therein a plurality of blades and a pair of tie members to which a radially outer end and a radially inner end of each of said blades are connected, respectively;

removing that one of said tie members which is connected to the inner end of each of said blades;

twisting each of said blades to thereby erect each of said blades from a plane which includes the other of said tie members;

bending each of joint pieces which are connected to the other of said tie members to thereby change a direction of said joint pieces;

cutting the other of said tie members to thereby obtain a semi-manufactured product which contains therein a required number of blades; and fixedly joining the other of said tie members at both ends thereof into a ring shape.

2. A blade assembly for a hydraulic power transmitting apparatus, said blade assembly comprising:

a plurality of blades disposed at an equal distance from one another;

a joint piece provided at a radially outer end of each of said blades;

a tie member for tying said blades together at said joint pieces, wherein said blades, said joint pieces and said tie member are integrally formed as a continuous semi-manufactured product of a belt-shaped metal plate having a thickness, each of said blades being erected from a plane including said joint pieces, said joint pieces being bent to change a direction of said tie member such that a thickness direction of the tie member is generally parallel to the plane including said joint pieces, said tie member containing therein a required number of blades, the tie member being fixedly joined together at both ends thereof into a ring shape.

3. A blade assembly according to claim 2, wherein said tie member of said blade assembly is fixedly connected to a shell outside an imaginary line which connects an outer peripheral line of fluid flow between a pump and a turbine which are constituting elements of the hydraulic power transmitting apparatus.

4. A blade assembly according to claim 3, wherein said blade assembly is disposed on a pump side and wherein said tie member of said blade assembly encloses an outer periphery of the turbine at a small clearance.

5. A blade assembly according to claim 3, wherein an outer edge of each of said blades are brazed to said shell.

6. A blade assembly according to claim 5, wherein an outer periphery of said tie member are brazed to said shell.

7. A blade assembly according to claim 4, wherein an outer edge of each of said blades are brazed to said shell.

8. A blade assembly according to claim 7, wherein an outer periphery of said tie member are brazed to said shell.

* * * * *